Figure 1:
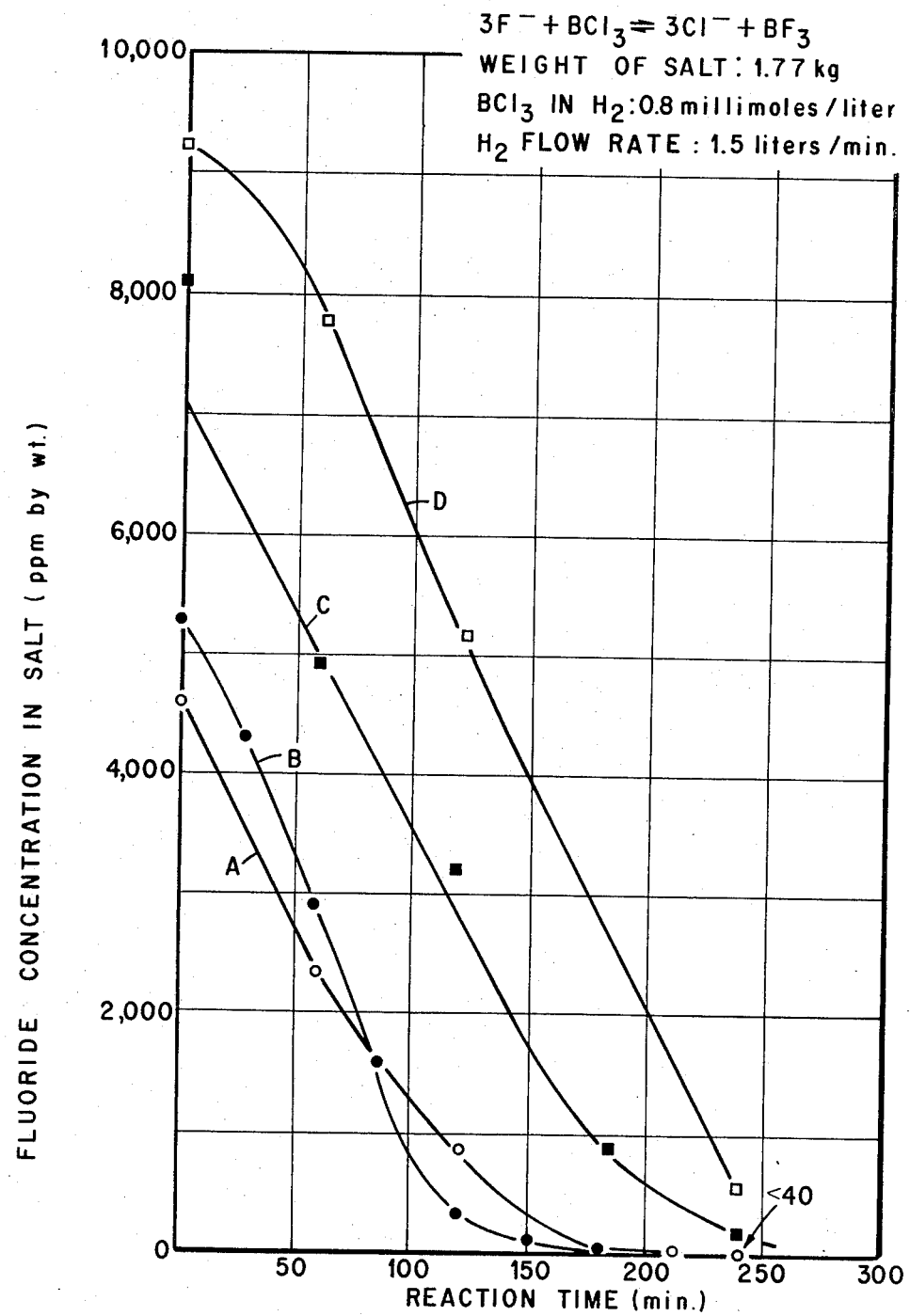

United States Patent [19]

Grimes et al.

[11] 3,806,581

[45] Apr. 23, 1974

[54] REMOVAL OF FLUORIDE FROM CHLORIDE OR BROMIDE MELTS

[75] Inventors: Warren R. Grimes; James H. Shaffer, both of Oak Ridge; Forrest A. Doss, Clinton, all of Tenn.

[73] Assignee: The United States of America as represented by the United States Atomic Energy Commission, Washington, D.C.

[22] Filed: Sept. 21, 1971

[21] Appl. No.: 182,495

[52] U.S. Cl.................. 423/179, 423/293, 423/499
[51] Int. Cl............................................ C22b 27/00
[58] Field of Search........ 252/301.1 R; 23/325, 326, 23/349, 89, 205; 423/293, 179, 499

[56] References Cited
UNITED STATES PATENTS

| 3,577,225 | 5/1971 | Shaffer et al. | 23/325 |
| 2,840,464 | 6/1958 | Wiswall | 75/84.1 |
| 2,805,130 | 9/1957 | Wood | 23/205 |
| 2,759,790 | 8/1956 | Spiegler | 23/326 |
| 2,668,750 | 2/1954 | Krchma | 23/89 |

OTHER PUBLICATIONS

Booth et al., The Fluorination of Boron Trichloride, J. Am. Chem. Soc. Vol. 65, p. 1836, (1943). QD1A5.

Primary Examiner—Carl D. Quarforth
Assistant Examiner—R. L. Tate
Attorney, Agent, or Firm—John A. Horan; David S. Zachry; Irving Barrack

[57] ABSTRACT

A method is provided for removing fluoride ion in a molten chloride or bromide melt which comprises passing sufficient gaseous $BCl_3$ through the melt to convert the $BCl_3$ to $BF_3$ and flushing the $BF_3$ from said melt.

2 Claims, 2 Drawing Figures

INVENTORS.
Warren R. Grimes
James H. Shaffer
Forrest A. Doss

INVENTORS.
Warren R. Grimes
James H. Shaffer
Forrest A. Doss

BY

ATTORNEY.

REMOVAL OF FLUORIDE FROM CHLORIDE OR BROMIDE MELTS

BACKGROUND OF THE INVENTION

The invention described herein was made in the course of, or under, a contract with the U.S. Atomic Energy Commission.

The advantages of this invention are realized by reacting gaseous $BCl_3$ with molten LiF or mixtures thereof. Under these conditions the $BCl_3$ is converted to gaseous $BF_3$ and is visualized as occurring in accordance with the general formula

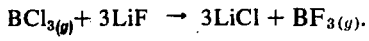

$$BCl_{3(g)} + 3LiF \rightarrow 3LiCl + BF_{3(g)}.$$

The method is simple, rapid, and effective and does not introduce any extraneous impurities into the system since the boron enters as a gaseous chloride and exits as a gaseous fluoride.

REPRESENTATIVE EMBODIMENT

Approximately 1.8 Kg of molten LiCl (650° C.) was loaded into a reaction vessel constructed from a 16-inch length of 4-inch nickel pipe having one end welded closed and having a top plate provided with a salt sampling port, a thermowell, and a sparge gas line. A known quantity of lithium fluoride was added to the molten LiCl and sparged with argon for mixing. Boron trichloride admixed with hydrogen was then bubbled into the molten LiCl at 650° C. The hydrogen was used as a carrier gas and to provide a reducing cover atmosphere to avoid oxidation effects. Any other inert cover gas would serve as well, such as helium or argon.

Filtered samples of the molten salt were withdrawn periodically before and during the experimental procedure and analyzed chemically for fluoride content. Samples of the gas influent and effluent streams were periodically collected in water and analyzed for $BCl_3$ by titration with standard caustic solution.

FIG. 1 shows how the fluoride concentration of several fluoride samples (runs A–D, inclusive) is rapidly diminished to low values with 4-hour reaction periods even at low $BCl_3$ concentrations of 0.8 millimole/liter of hydrogen in the sparge gas stream. It is seen that initial concentrations of 5,000 to 10,000 ppm were rapidly diminished to low values in slightly more than 4 hours to allow a $BCl_3$ concentration of 0.8 millimole per liter of $H_2$ in the sparge gas stream.

Figure 2:
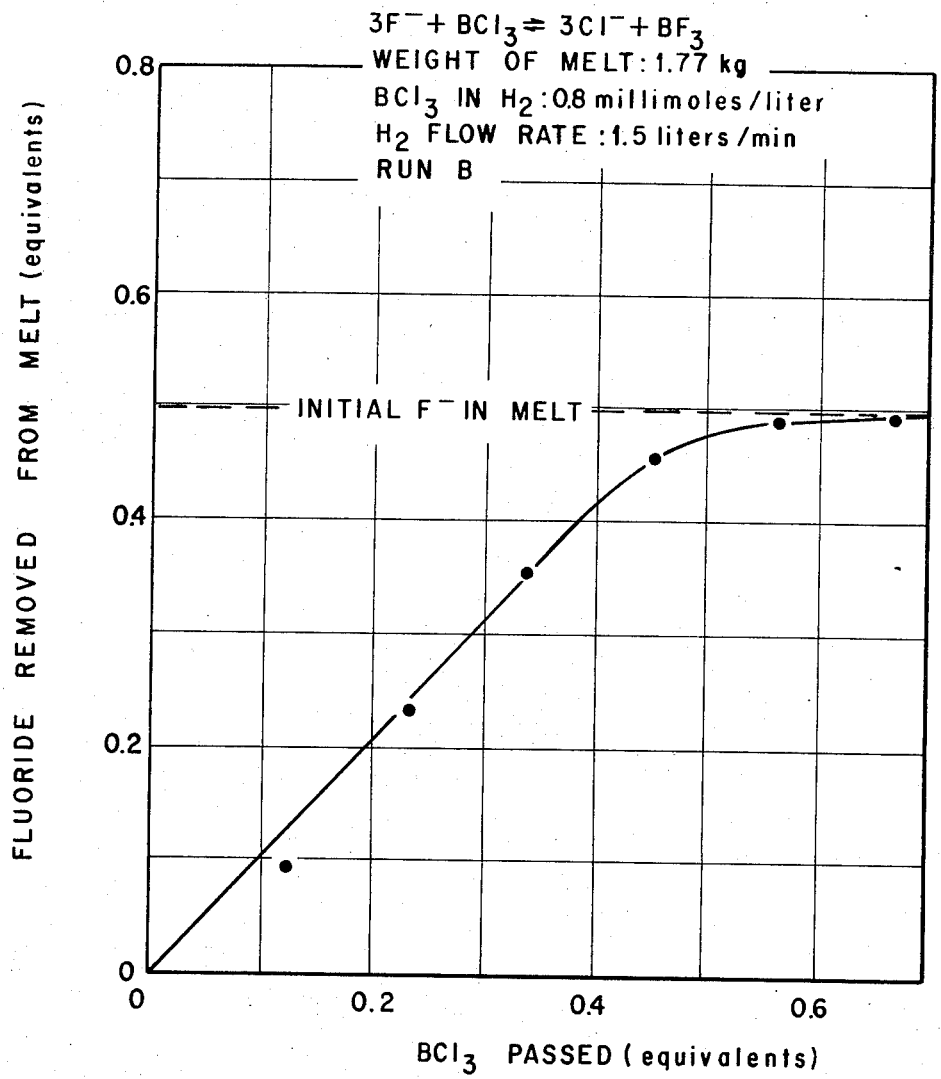

Subsequently, experiments were carried out to determine relative reaction velocity constants and equilibrium quotients. As shown by FIG. 2, the reaction of fluoride ion with $BCl_3$ is essentially quantitative even at low $BCl_3$ concentrations. Thus, the rate of chemical reaction is controlled by the rate at which $BCl_3$ is admitted to the system. Values calculated for the equilibrium relation are given by $$K = N_{BF_3} / N_{BCl_3} \cdot 1/N_{F^-}^3,$$

where $N$ is the mole fraction of the entities identified in the subscript which show a continuous increase, approaching a value of $10^{14}$ as a limit, as the fluoride ion concentration in the melt diminished. Thus we have shown that the adverse quantities of fluoride can be effectively removed from LiCl. In a generic sense, the invention is useful in any situation where molten chlorides are contaminated with fluoride ion.

What is claimed is:

1. A method for removing fluoride ion contained as an impurity in a molten alkali metal chloride which comprises passing sufficient gaseous $BCl_3$ through the melt to convert the fluoride ion to $BF_3$ and flushing the resultant $BF_3$ from said melt.

2. The method according to claim 1 wherein the alkali metal molten chloride is lithium chloride.

* * * * *